US006779954B2

(12) United States Patent
Tomayko

(10) Patent No.: US 6,779,954 B2
(45) Date of Patent: Aug. 24, 2004

(54) ROUTER DEPTH OF CUT ADJUSTMENT

(75) Inventor: David C. Tomayko, Ellicott City, MD (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 10/188,618

(22) Filed: Jul. 3, 2002

(65) Prior Publication Data

US 2004/0005201 A1 Jan. 8, 2004

(51) Int. Cl.[7] .................................................. B23C 1/20

(52) U.S. Cl. .................. 409/182; 409/178; 144/136.95; 144/154.5

(58) Field of Search ................................ 409/182, 178, 409/218, 131; 144/136.95, 154.5

(56) References Cited

U.S. PATENT DOCUMENTS

| | | | | |
|---|---|---|---|---|
| 1,532,683 A | | 4/1925 | Carter | |
| 2,591,002 A | | 4/1952 | Pedron | |
| 2,630,152 A | | 3/1953 | Turnbull | |
| 2,842,173 A | | 7/1958 | Turner et al. | |
| 2,867,251 A | | 1/1959 | Moretti et al. | |
| 3,332,462 A | * | 7/1967 | Williams | 144/136.95 |
| 3,433,479 A | | 3/1969 | Huck et al. | |
| 3,581,787 A | * | 6/1971 | Bane | 409/178 |
| 4,244,406 A | | 1/1981 | Stielper | |
| 4,640,324 A | * | 2/1987 | Lounds | 409/182 |
| 4,679,606 A | | 7/1987 | Bassett | |
| 4,688,613 A | | 8/1987 | Bassett | |
| 4,693,656 A | | 9/1987 | Guthrie | |
| 4,787,794 A | | 11/1988 | Guthrie | |
| 4,946,323 A | | 8/1990 | Kazama et al. | |
| 5,074,724 A | | 12/1991 | McCracken | |
| 5,078,557 A | | 1/1992 | McCracken | |
| 5,088,865 A | | 2/1992 | Beth et al. | |
| 5,176,479 A | | 1/1993 | McCracken | |
| 5,181,813 A | | 1/1993 | McCracken | |
| 5,188,492 A | | 2/1993 | McCracken | |
| 5,590,988 A | | 1/1997 | Rusconi | |
| 5,613,813 A | | 3/1997 | Winchester et al. | |
| 5,913,645 A | * | 6/1999 | Coffey | 409/182 |
| 6,050,759 A | | 4/2000 | Bone | |

FOREIGN PATENT DOCUMENTS

| | | |
|---|---|---|
| DE | 2035892 | 2/1971 |
| EP | 0830923 | 3/1998 |

* cited by examiner

*Primary Examiner*—Al Wellington
*Assistant Examiner*—Dana Ross
(74) *Attorney, Agent, or Firm*—Bruce S. Shapiro; Michael P. Leary; Charles E. Yocum

(57) ABSTRACT

A fixed base router with an adjustable depth of cut comprising a motor unit including a first threads and an output spindle, a router bit operatively connected to the output spindle of the motor unit, an adjustment ring including a second threads for cooperation with the first threads of the motor unit for adjustment of the depth of cut of the router bit, a base for supporting the adjustment ring, and a plurality of clip assemblies for selectably coupling the adjustment ring to the base assembly, and wherein the clip assemblies are simultaneously operable by the fingers of one hand of the person using the router.

5 Claims, 9 Drawing Sheets

ROUTER DEPTH OF CUT ADJUSTMENT

BACKGROUND OF THE INVENTION

1. Field of the Invention

The present invention relates generally to the field of power tools. In particular the present invention relates to a depth of cut adjustment arrangement for a router. More particularly, it relates to a router depth of cut adjustment employing a threaded ring.

2. Discussion

Various types of power tools comprise a cutting tool or bit that is raised or lowered relative to a base that rests on or against the workpiece. Often the tool or bit is attached to the output shaft of a motor unit that can be vertically or axially moved relative to the base. Movement of the motor unit and attached tool bit relative to the base unit determines the depth of cut into the workpiece.

Routers, including some laminate trimmers, are constructed according to this basic design. The router bit is attached to the motor output spindle by means of a tool holder such as a collet or chuck and the bit projects through an opening in the base to contact the workpiece. The motor unit is mounted to the base by means that allow the operator to move the motor and bit axially relative to the base in order to determine the depth of cut of the bit.

Router base and depth of cut systems fall into two commonly recognized categories. They are plunge base routers and fixed base routers (including so-called D-handle bases). Generally speaking, plunge routers comprise a generally planer base element, a motor unit, and a plurality of support columns on which the motor unit is vertically movably mounted above the base. Usually, the motor unit is biased upward or away from the base. Means are provided for finely adjusting the depth of cut and for locking the motor unit at the selected depth/height against the biasing force.

Fixed base routers usually comprise a generally cylindrical base and a motor unit with a cylindrical housing portion. The cylindrical portion of the motor housing fits snugly but movably within an annulus of the cylindrical portion of the base with the motor spindle and router bit projecting downward beyond the lowest portion of the base. The cylindrical portion of the base often includes a longitudinal or axial cut or gap that permits the base diameter to expand or contract slightly under the force of a clamp mechanism that bridges the gap and that can be used to tighten the base onto the motor housing within. Means for adjusting the depth of cut by adjusting the vertical or axial position of the motor unit and bit within the base are also provided. The base clamp is loosened for adjusting the cutting depth and after the desired depth is set with the depth adjusting means the base clamp is tightened to lock the motor housing at the set position.

One known means for adjusting the depth of cut in a fixed base router employs a rack and pinion arrangement. A toothed rack is attached in the axial direction on the exterior of the motor housing while a pinion is attached to the base so as to engage the pinion. Means, such as a knob, are provided for the operator to turn the pinion. Turning of the pinion drives the rack and the attached motor and bit. See for example U.S. Pat. No. 3,466,973 to Rees.

Another well known means for adjusting the depth of cut consists essentially of providing threads on the exterior of the motor unit and matching threads on the base assembly. Screwing the motor unit into and out of the base assembly raises and lowers the motor and cutter like a nut in a bolt. See for example U.S. Pat. No. 1,899,833 to Sacrey and U.S. Pat. No. 2,562,143 to Godfrey et al. Among several disadvantages of this means for adjusting the depth of the router is that the rotation of the router power head within the base assembly is problematic due to the presence of the power cord connected to the motor, which tangles or interferes with the rotation of the motor unit.

A refinement on the threaded motor unit concept is the replacement of a fully threaded base with a threaded ring or nut rotatably mounted on the base element. In such a mechanism, the ring can be manually rotated to raise and lower the power head relative to the base element without relative rotation between the motor unit and base element. See for example U.S. Pat. No. 2,988,199 to Godfrey et al. In some embodiments according to this concept means are provided to restrain the motor from turning within the base. These restraining means can take the form of an axial groove within the annulus of the base that is slideably engaged by a stud or projection on the exterior surface of the motor housing or vice versa. The engagement of the projection and the groove prevents the motor housing from turning within the base.

In some of these ring designs the ring merely rests atop the base element. This presents a problem, however, if the router is inverted. When inverted, the ring and the motor unit will tend to fall out of the base element unless the base clamp, if provided, has been sufficiently tightened to hold the motor by compression. When a router is mounted upside down in a router table, it is necessary to loosen the base clamp to adjust the depth of cut, then, unless additional connecting structure is provided, the problem remains of the motor and ring falling out of the router base.

In a further refinement, the ring can be rotatably connected with the base element so that it can retain and raise or lower the power head even when inverted. See U.S. Pat. No. 2,842,173 to Turner and U.S. Pat. No. 5,613,813 to Winchester et al. A disadvantage of a ring that is permanently axially connected to the base is that it prevents quick removal of the motor unit. Instead the motor must be unscrewed from the ring and base assembly—usually requiring numerous turns of the ring to fully raise and free the motor housing. Quick and easy removal of the motor unit is desirable for convenient access to the motor spindle and collet/chuck when changing router bits. The inability of a fixed ring to quickly release the motor forces design choices between steep thread pitches of approximately 2 inches per revolution or greater, which can lower and raise and free the motor quickly, and fine thread pitches of approximately ½ inch per revolution or less, which provide greater depth control, but require numerous turns to raise and free the motor.

In another variation, the Porter-Cable Model 310 laminate trimmer employs a ring that is held axially atop the cylindrical base by means of a pair of steel leaf spring clips. See FIG. 13. Th clips 140 are mounted to the exterior of the base 120 and engage a v-shaped circumferential groove 136 around the outer side of the depth adjustment ring 130. So constructed, the ring 130 is axially secured to the base 120, but the motor using 114 and ring can be quickly detached and removed from the base.

Due to their small size, sharp edges, orientation and stiffness, the thin steel leaf spring clips 140 of the Porter-Cable Model 310 are extremely difficult to manipulate and do not appear to have been designed with the intention that the tool user actually operate them with his fingers. In practice, the Model 310 motor 114 is removed from the base 120 by a pull on the motor sufficient to overcome the compression force of the clips 140 engaged in the ring groove 136. Thus, the leaf spring clips 140 act rather as a mere detent mechanism that the motor 114 and ring 130 can be pushed in and pulled out of with only modest force. After adjustment of the depth a cut the base is tightened on the motor with a base clamp, as described above.

Laminate trimmers are essentially, however, very small routers. The motors of laminate trimmers are of less than one horsepower and usually draw less than 5 amps. Such small motors usually weigh less than five pounds. Furthermore, laminate trimmers are not usually used inverted and are not intended for mounting upside down in router tables. For such small lightweight routers that are infrequently inverted, the Model 310 clips provide satisfactory retention of the ring and motor with convenience of removal.

Regular, fixed based, wood working routers, however, have motors of approximately 1 to 3 or more horsepower, draw 5 to 10 or more amps, and weigh 5 or more pounds. Construction professionals and woodworking hobbyists frequently use such routers upside down and want to be able to mount them inverted under a router table for prolonged periods. The Model 310 ring system, however, does not scale up well to retain and operate these larger and heavier motors. The leaf spring clips do not exert sufficient compressive force to hold the ring and heavy motors against the force of gravity and the occasional shock. Moreover, as mentioned above, the size, sharp edges, orientation and stiffness of the Model 310 leaf springs clips make them difficult to manipulate, so that in practice the motor and ring are pulled out of the base with the clips serving as a detent. Furthermore, the structure of the Model 310 clips do not permit the user to loosen the clips with one hand while grasping the motor or base with his or her other hand.

SUMMARY OF THE INVENTION

It is, therefore, one object of the invention to provide a tool with an axial depth of cut adjustment arrangement that both securely retains the motor unit in the base when inverted, but also provides for quick and convenient release of the motor from the base.

It is another object of the invention to provide a retaining mechanism with exposed and graspable elements that will permit the tool user to release the motor from the base by operation of those elements with one hand.

It is still another object of the invention to provide a fixed base router with a threaded depth adjustment ring that can be selectably detachable from the router base.

This and other objects of the invention are attained by a fixed base router, with a height adjustment ring that is in turn removably attached to the base by a manually operable clip. The clip is large enough and resilient enough to retain the motor unit of a large router when inverted and can be manually released.

Because of the provision of a convenient mechanism for release of the motor from the base, another object of the invention is the identification of thread pitch for the motor housing and depth adjustment ring that provides an optimal compromise between fine and accurate depth control and quick and convenient gross adjustment depth adjustment.

BRIEF DESCRIPTION OF THE DRAWINGS

Additional objects and advantages of the present invention will become apparent from a reading of the following detailed description of the preferred embodiments that make reference to the drawings of which.

DETAILED DESCRIPTION

The present invention provides a depth adjustment mechanism for a power tool. More particularly it provides a depth adjustment mechanism for a power tool wherein a motor unit is axially movable within a base element. While shown through the drawings in various embodiments of a fixed base router, those skilled in the art will appreciate that the invention is not so limited in scope. In this regard, the teachings of the present invention will be understood to be readily adaptable for use in any tool incorporating a motor housing axially movable in a base assembly by means of rotatable ring element threadably engaged with the motor housing.

Figure 1:
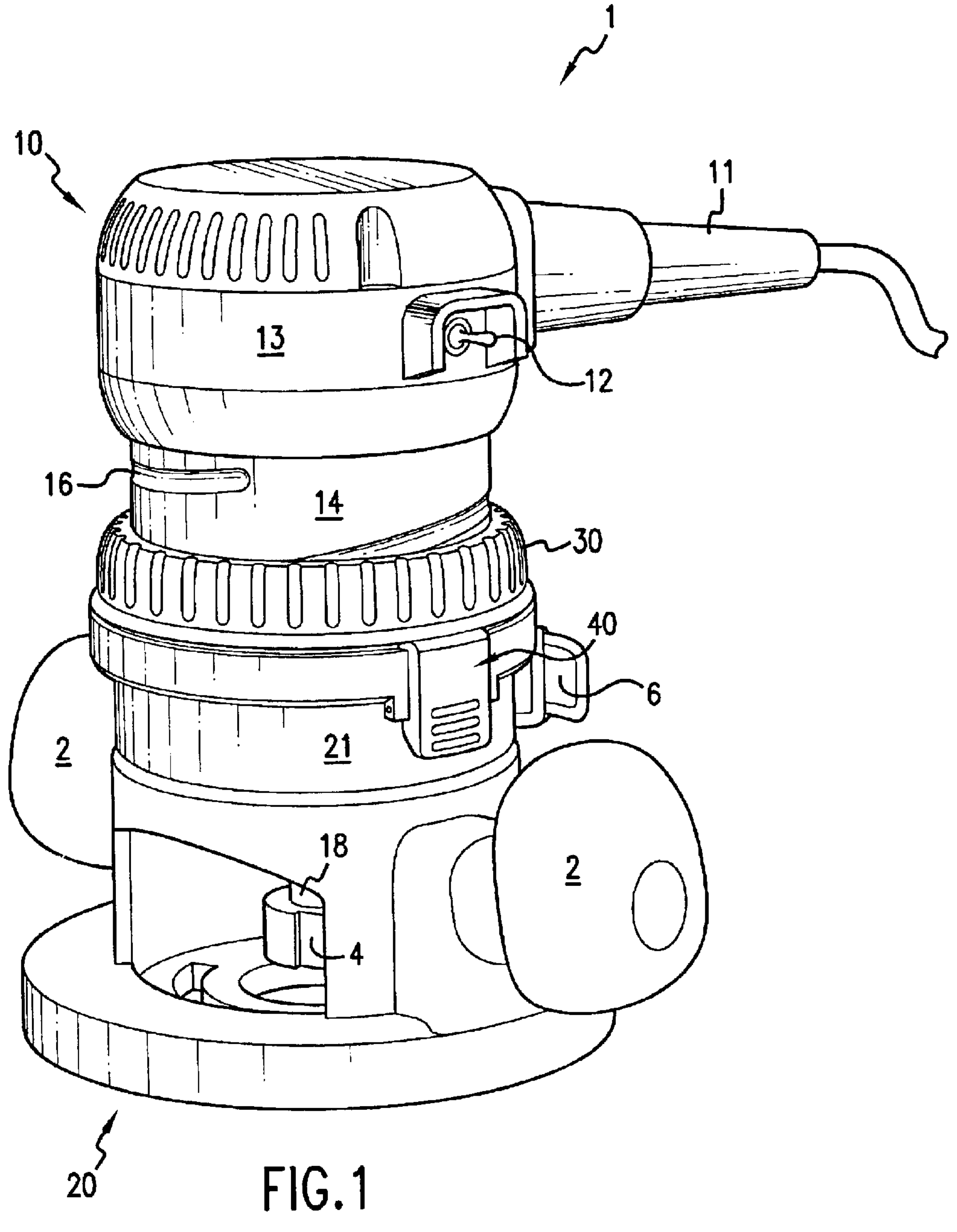
FIG. 1 is an exterior perspective view of a power tool selectably detachable depth adjustment ring according to the present invention.
Figure 2:
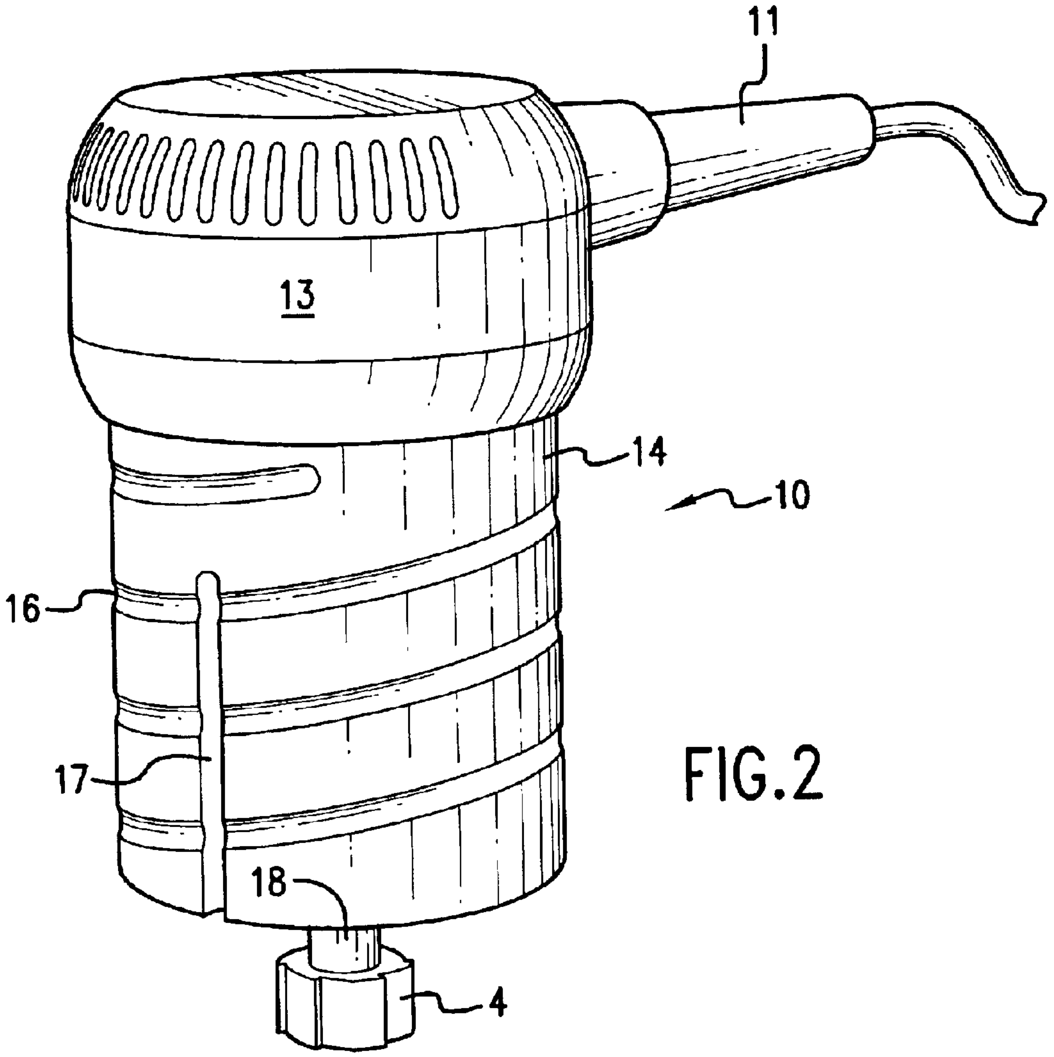
FIG. 2 is an exterior perspective view of the motor unit of the power tool of FIG. 1.
Figure 3:
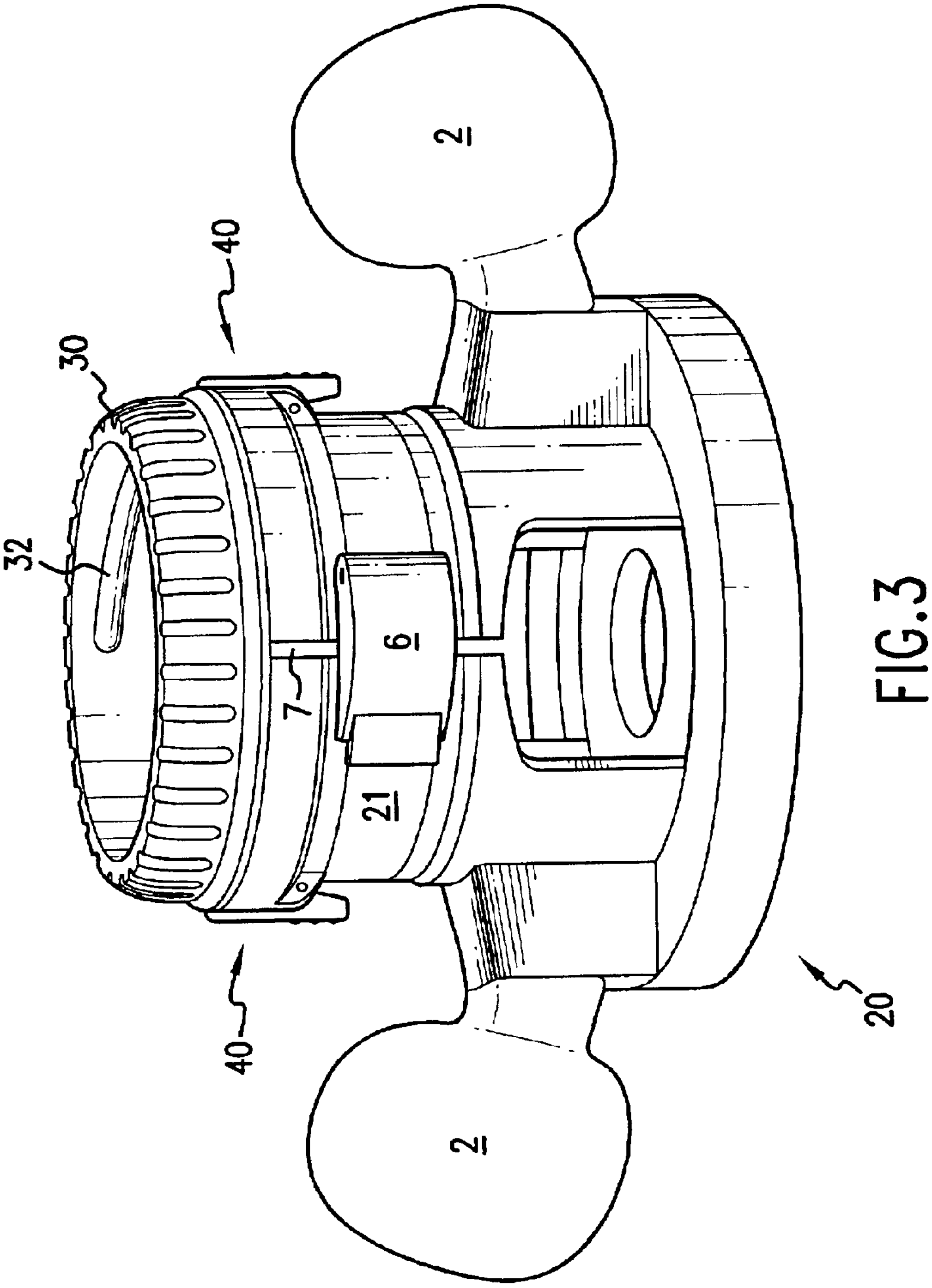
FIG. 3 is an exterior side view of the base assembly of the power tool of FIG. 1.

Turning generally to the drawings in which identical or equivalent elements have been denoted with like reference numerals, and particularly to FIGS. 1, 2, and 3 a power tool is illustrated and designated with the reference numeral 1. The particular power tool shown is, for example, a fixed base router 1 including a motor unit 10, a base assembly 20, and a depth of cut adjustment ring 30.

The motor unit 10 contains an electric motor (not shown) in a housing comprising a head portion 13 and a cylindrical portion 14. The motor is powered through a cord 11 and controlled by a switch 12. Projecting from the bottom of the motor unit 10 is the motor spindle 18 on the end of which is located a collet 4 of the well known kinds. Motor housing cylindrical portion 14 has exterior threads 16 that engage the depth of cut adjustment ring 30. Motor cylindrical portion 14 also includes an exterior and axially oriented longitudinal slot 17 that serves to prevent rotation between the motor unit 10 and the base 20 by engaging with a stud (not shown) in the interior of the base.

The base assembly 20 includes handles 2, and an upper portion 21. Upper portion 21 is generally cylindrical in shape and is split by an axial gap 7 that permits expansion or contraction of the upper portion under the influence of clamp 6, which is constructed and operates in a well known manner. Upper portion 21 defines a generally cylindrical annulus which is sized to accommodate the cylindrical portion 14 of the motor housing such that when the clamp 6 is released the motor 10 may slide easily within the base 20, and when the clamp 6 is closed/engaged the cylindrical portion 14 is firmly and nonslidably gripped within the upper portion 21 of the base.

Figure 4:
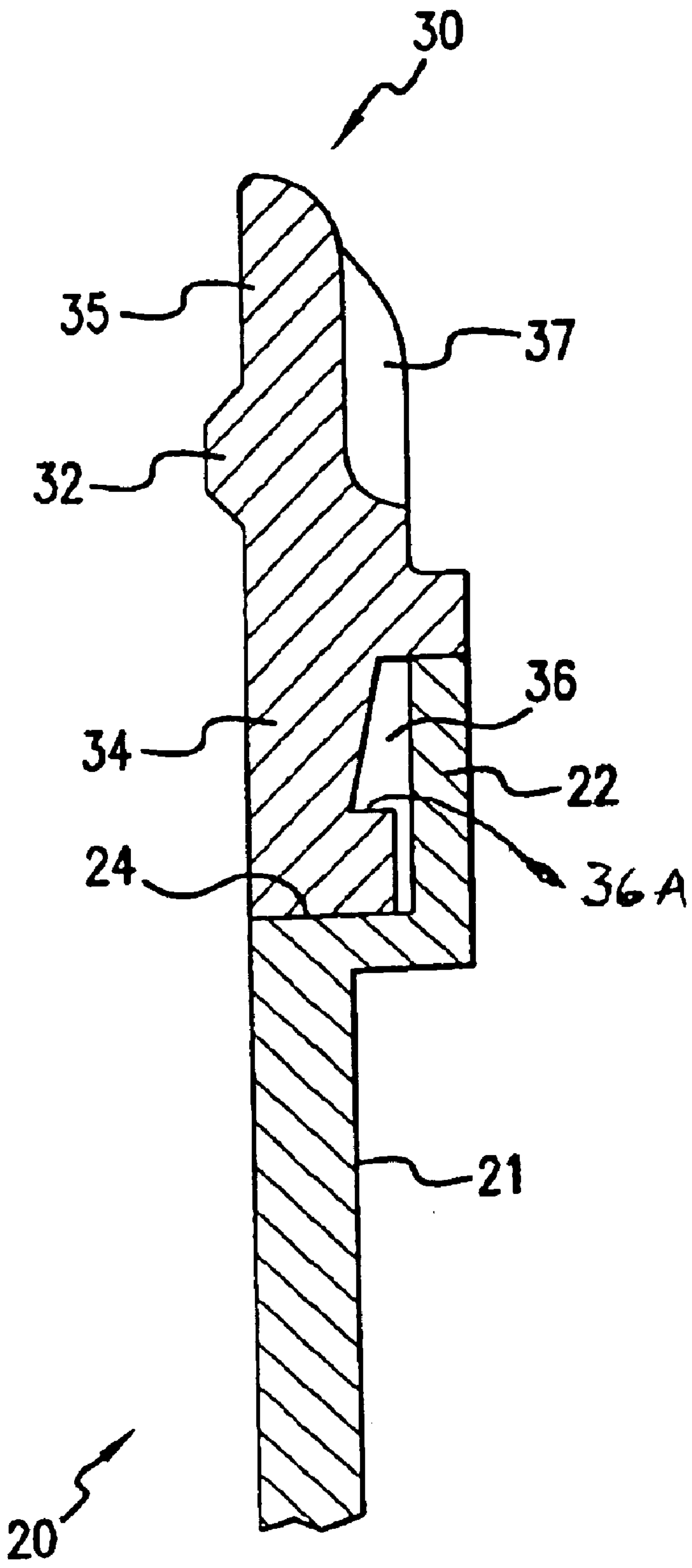
FIG. 4 is an axial cross-section view of a portion of the base and depth adjustment ring of the power tool of FIG. 1.
Figure 5:
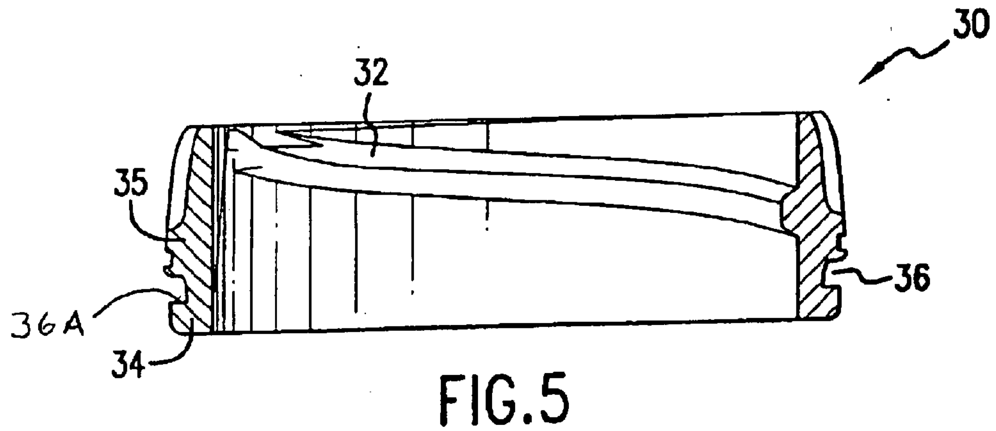
FIG. 5 is an axial cross-section view of the depth adjustment ring of the power tool of FIG. 1.
Figure 6:
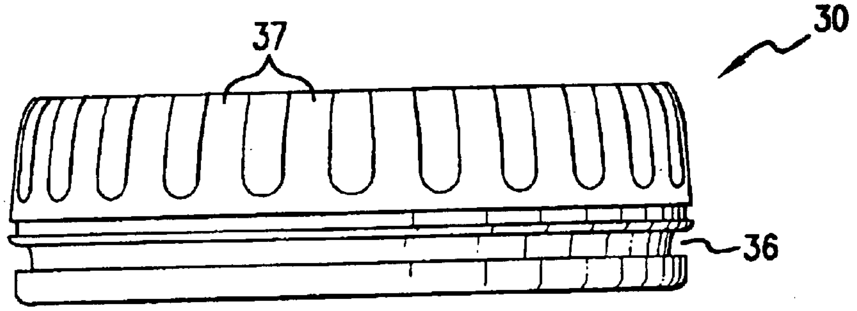
FIG. 6 is an exterior side view of the depth adjustment ring of the power tool of FIG. 1.

A depth adjustment ring 30 is connected to the top portion 21 of base 20 by means that will be described in detail below. With reference to the attached FIGS. 4, 5 and 6 the lower portion 34 of height adjustment ring 30 rests on a shelf 24 inside the upper lip 22 of the base 20. The outer face of ring 30 also defines a circumferential groove 36 including a first surface 36A substantially perpendicular to the axis of the ring. An upper portion 35 of ring 30 includes ribs 37 to provide an improved gripping surface for turning the ring. The inner face of ring 30 includes a thread 32. Due to the selectably detachable feature of the depth adjustment ring according to the present invention, the need for a steep screw pitch that can quickly raise and lower the motor for ease of installation/removal is eliminated. Therefore, a pitch more optimally compromised between course and fine depth adjustment can be selected. Preferably, a screw pitch is employed that will raise or lower the motor unit 10 approximately 1 inch per rotation of the depth adjustment ring 30.

Figure 7:
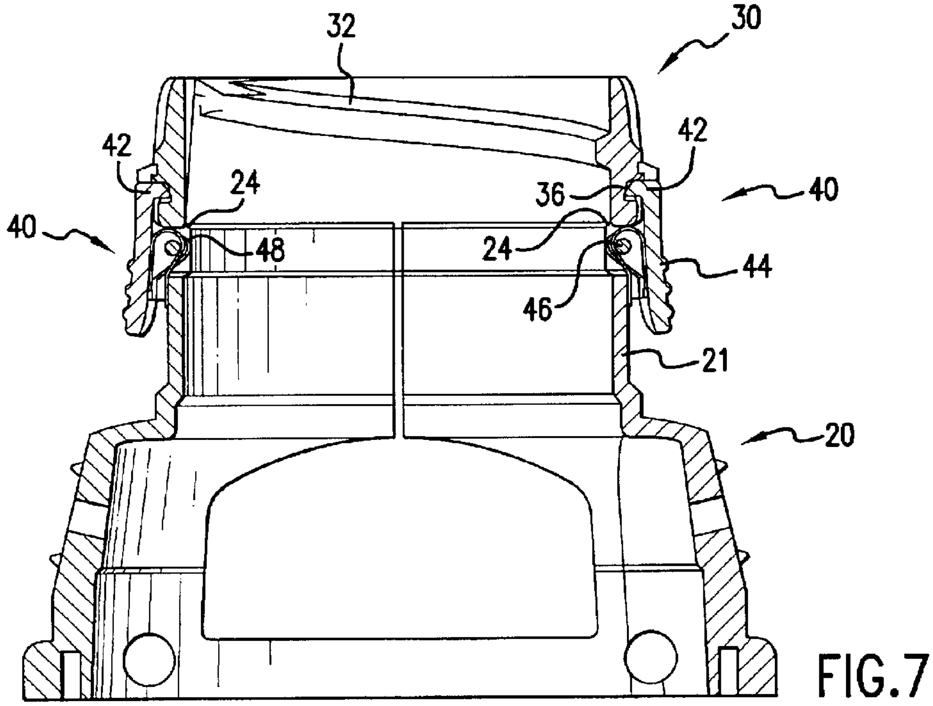
FIG. 7 is an axial cross section view of the base, depth adjustment ring, and clip assembly portions of the power tool of FIG. 1.
Figure 8:
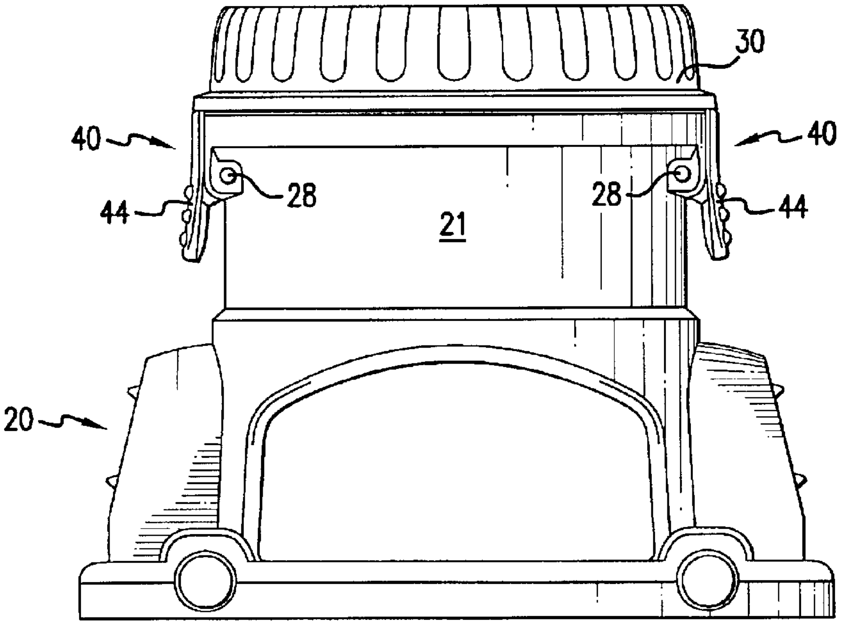
FIG. 8 is an exterior side view of the base, depth adjustment ring, and clip assembly portions of the power tool of FIG. 1.
Figure 9:
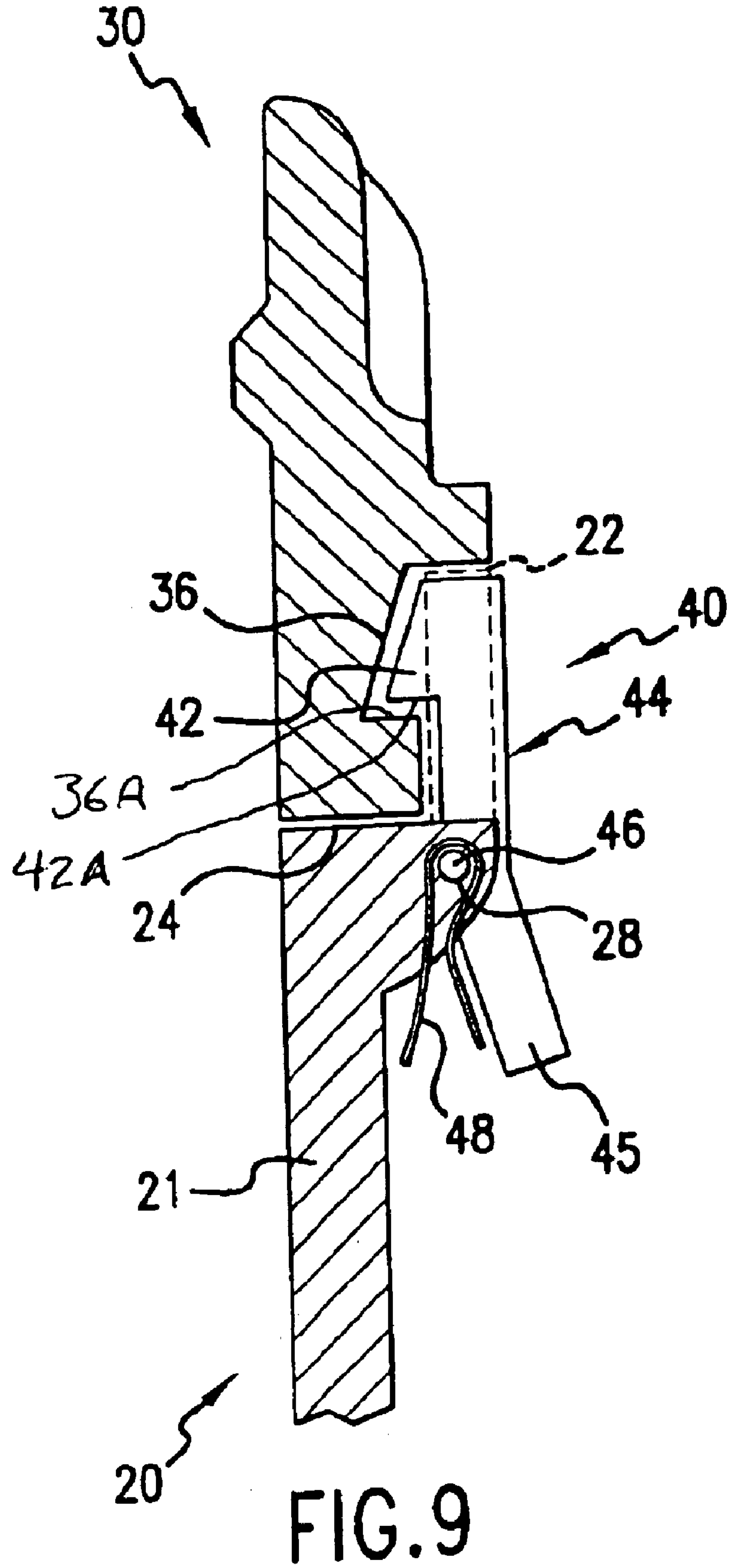
FIG. 9 is an expanded cross section view of the base, depth adjustment ring, and clip assembly portions of the power tool of FIG. 7.

Referring now to FIGS. 7, 8, and 9, mounted on the base 20 are at least two clip assemblies 40. The clip assemblies include a lever 44 that is pivotably mounted to the base 20. A lip 42, including a second surface 42A, on each of the levers 44 selectably and slidably engages the ring groove 36 at first surface 36A and axially retains the ring 30 on the shelf 24 and inside the upper lip 22 of the base 20. Alternatively, the clips assemblies could be mounted on the ring and slidably engage a groove on the base.

Figure 10:
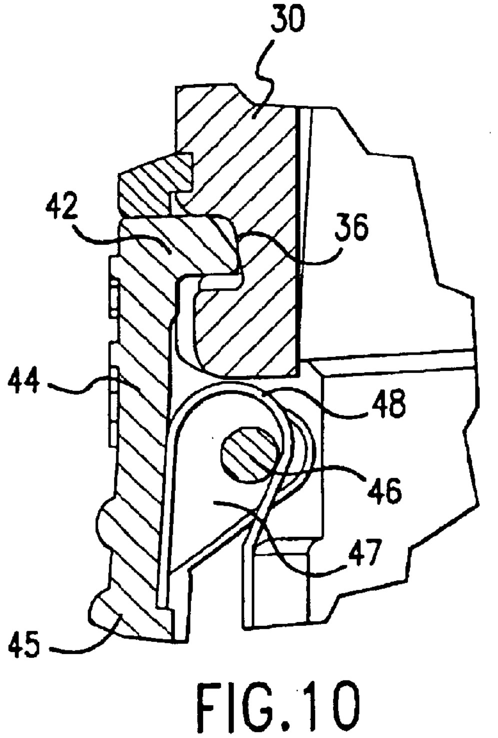
FIG. 10 is a further expanded cross section view of the base, depth adjustment ring, and clip assembly portions of the power tool of FIG. 7.
Figure 11:
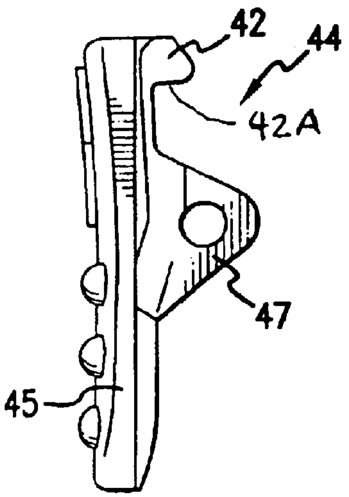
FIG. 11 is an exterior side view of the clip lever of the power tool of FIG. 1.

With additional reference to FIGS. 10 and 11, the clip assemblies 40 also include a pin 46 and a spring 48. As depicted the levers 44 are pivotably mounted to the base 20 in cutouts 26 in the upper portion 21 of the base 20, including the lip 22. Pin 46 passes through a hole or ears 47 in lever 44 and engages holes 28 in the base 20. Lever 44 pivots around or with pin 46. Alternatively, lever 44 could be pivotably connected to the base 20 by means of studs rotatingly captured in holes in the base.

Spring 48 is depicted as a leaf spring, but could also include a coil spring around pin 46, a suitably located compression spring, or other known spring types and configurations. Spring 48 biases pivoting lever 44 into a clamped position, wherein lip 42 engages with the ring groove 36. Spring 48 acts between the base 20 and the inside of the lever 44 to force the lower portion of the lever outward and the upper portion inward against the ring 30. The lower portion of the lever 44 constitutes a tab 45 that can be pressed with the operator's fingers in order to move the lever 44 to a released position. In the released position the lip 42 of the lever 44 is retracted from the groove 36, so that the ring 30 and motor unit 10 may be removed from the base 20.

Figure 12:
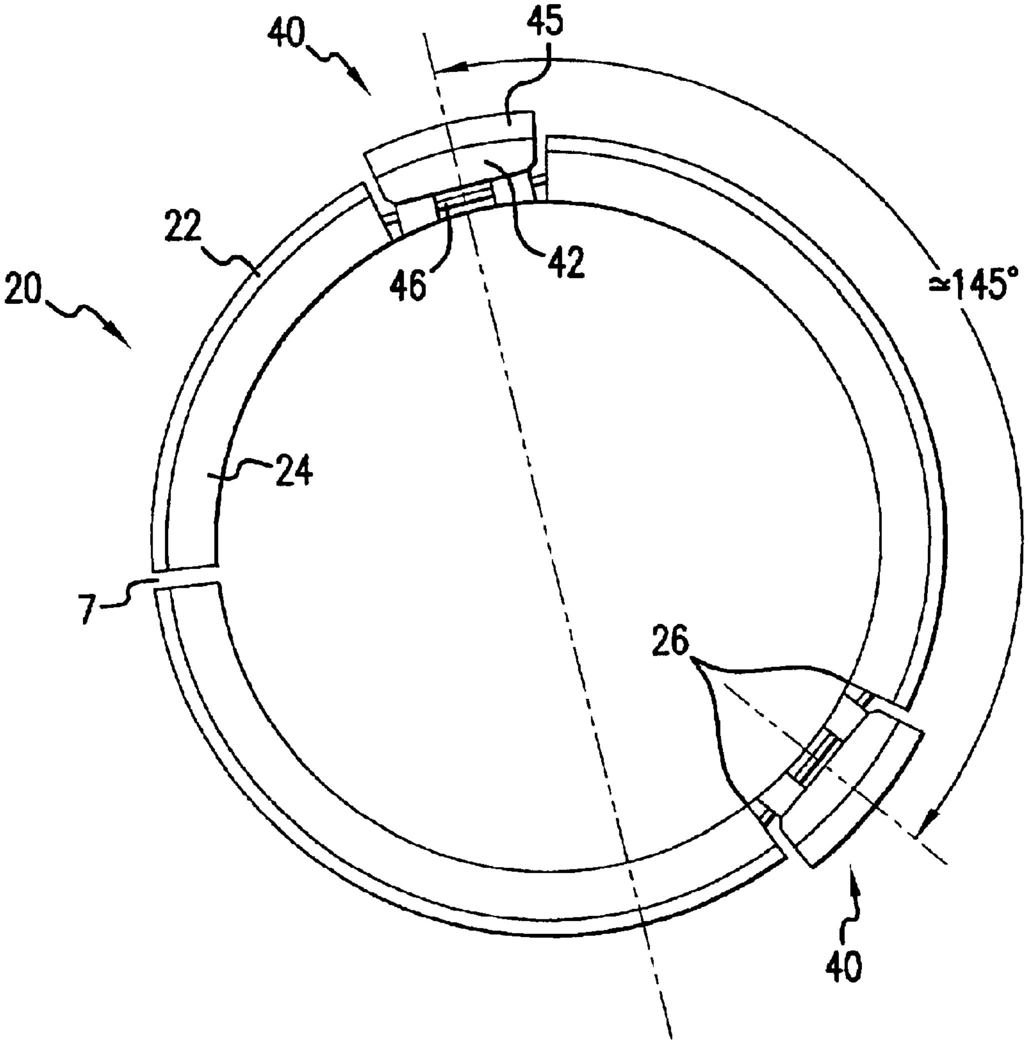
FIG. 12 is a top view of an alternative embodiment of the base and clip assembly in accordance with the present invention.
Figure 13:
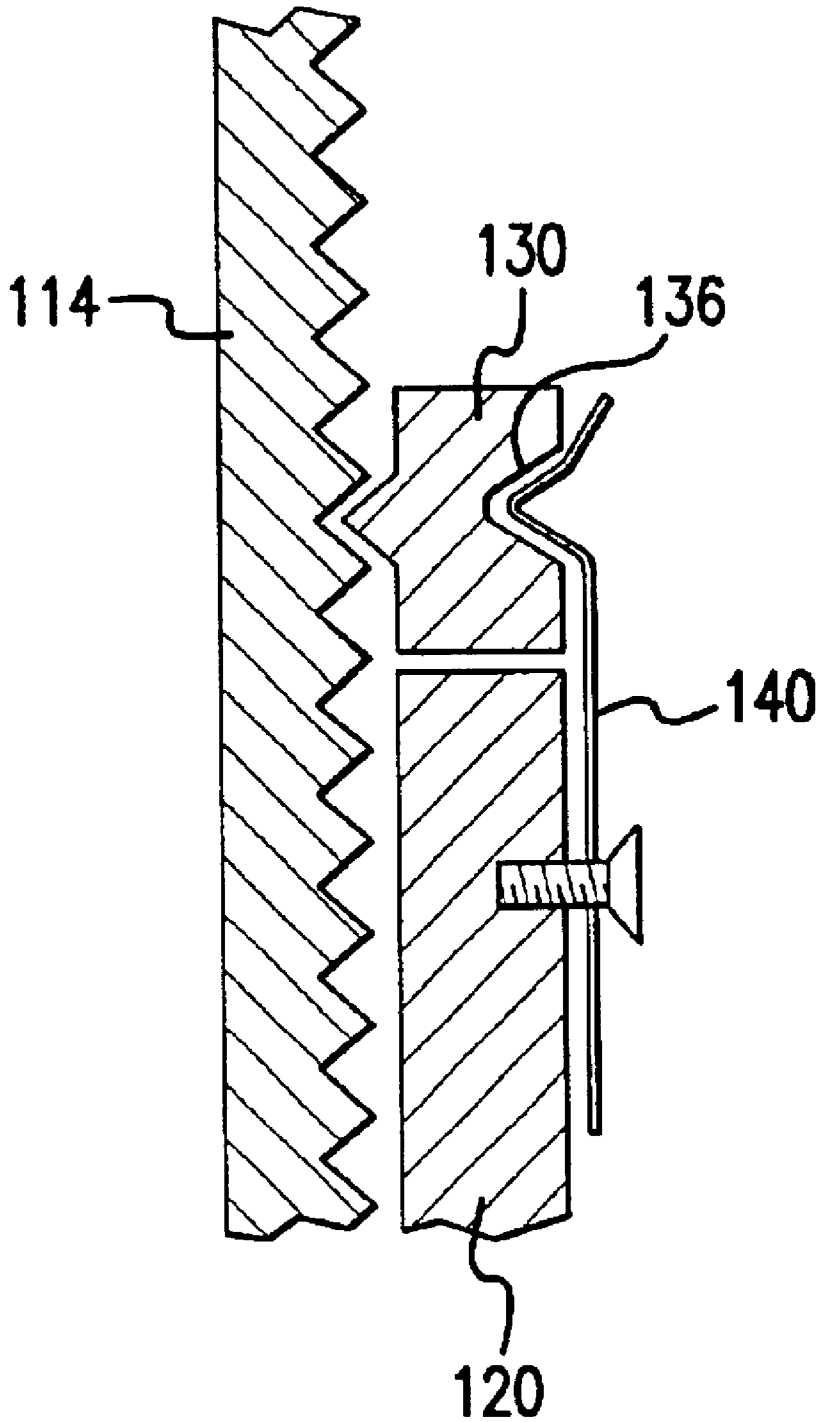
FIG.13 PRIOR ART
FIG. 13 is an axial cross-section view of the depth adjustment and retention portions of a prior art power tool.

Preferably router 1 includes two clip assemblies 40 located at positions around the upper circumference of base 20 such as to adequately grip and retain the ring 30 and also to be simultaneously operable by the fingers of one hand, for example the thumb and forefinger. In order to retain the ring 30 to the base 20 it is not necessary that the clips 40 be directly opposite each other, that is they need not be 180° apart around the circumference of the base. As shown in FIG. 12, the clips 40 can be spaced apart by less than 180°, for example by approximately 145°, in one direction and still adequately secure the ring 30 to the base 20. The option to shorten the angular separation between the two clips 40 can allow one hand to span the distance between the clips even on larger diameter routers. It also provides design flexibility to relocate a clip or clips if required by the presence of other structural elements.

While the above description constitutes a preferred embodiment of the invention, it will be appreciated that the invention is susceptible to modification, variation, and change without departing from the proper scope or fair meaning of the accompanying claims.

What is claimed is:

1. A portable router with an adjustable depth of cut comprising:

- a motor unit including a first threads and an output spindle;
- a router bit operatively connected to the output spindle of the motor unit;
- an adjustment ring having an axis of rotation and including a groove and a second threads, the second threads for cooperation with the first threads of the motor unit for adjustment of the depth of cut of the router bit, and the groove having a first surface substantially perpendicular to the axis of rotation of the adjustment ring;
- a base for surrounding the motor unit and rotatably supporting the adjustment ring;
- at least one clip assembly including a lip with a second surface, the clip movable from between a first position, wherein the lip engages the groove of the adjustment ring, and a second position wherein the lip is disengaged from the groove; and
- wherein, when the lip is engaged in the groove, the second surface is substantially perpendicular to the axis of rotation of the adjustment ring.

2. The fixed base router of claim 1 wherein the clip assemby includes a lever pivotably mounted on one of the adjustment ring and the base.

3. The portable router of claim 2 wherein the clip assembly further includes spring which biases the lever into the first position.

4. The portable router of claim 3 wherein the lever includes a tab portion for moving the lever to the second position against the biasing action of the spring.

5. The portable router of claim 1 wherein the base defines a gap and includes a clamp assembly, the clamp assembly operable for compressing the gap so as to cause the base to grip the motor unit and prevent movement of the motor unit within the base.

* * * * *